United States Patent
Liang et al.

(10) Patent No.: US 7,830,960 B2
(45) Date of Patent: Nov. 9, 2010

(54) MODE SELECTION TECHNIQUES FOR INTRA-PREDICTION VIDEO ENCODING

(75) Inventors: Yi Liang, San Diego, CA (US); Stephen Molloy, Carlsbad, CA (US)

(73) Assignee: QUALCOMM Incorporated, San Diego, CA (US)

(*) Notice: Subject to any disclaimer, the term of this patent is extended or adjusted under 35 U.S.C. 154(b) by 1203 days.

(21) Appl. No.: 11/036,447

(22) Filed: Jan. 13, 2005

(65) Prior Publication Data

US 2006/0153292 A1    Jul. 13, 2006

(51) Int. Cl.
*H04N 7/12* (2006.01)
(52) U.S. Cl. .............. 375/240.12; 375/240.13; 375/240.14; 375/240.15; 375/240.01; 375/240.25; 375/240.26
(58) Field of Classification Search ............... 375/240.12–240.16, 240.01
See application file for complete search history.

(56) References Cited

U.S. PATENT DOCUMENTS

| | | | |
|---|---|---|---|
| 6,014,694 A * | 1/2000 | Aharoni et al. ............ 709/219 |
| 7,103,669 B2 * | 9/2006 | Apostolopoulos ........... 709/231 |
| 7,324,595 B2 * | 1/2008 | Cote et al. ............. 375/240.12 |
| 2004/0258162 A1 * | 12/2004 | Gordon et al. .......... 375/240.25 |

OTHER PUBLICATIONS

Llopis, R. Peset, et al, "A Low-Cost and Low-Power Multi-Standard Video Encoder"; Codes+ISSS; Oct. 2003; pp. 97-102.
Bialkowski, Jens, et al; "Fast Transcoding of Intra Frames Between H.263 and H.264"; IEEE 2004; Germany; pp. 2785-2788.

* cited by examiner

*Primary Examiner*—Andy S. Rao
*Assistant Examiner*—Geepy Pe
(74) *Attorney, Agent, or Firm*—Kenyon Jenckes; John Rickenbrode

(57) ABSTRACT

In one embodiment, this disclosure provides an encoding device comprising a mode selection engine that performs mode selection for intra-prediction encoding regardless of whether the encoding device is programmed to comply with first encoding standard or a second encoding standard. The device also includes a first encoder to perform the intra-prediction encoding according to the selected mode in compliance with the first encoding standard when the encoding device is programmed to comply with the first encoding standard, and a second encoder to perform the intra-prediction encoding according to the selected mode in compliance with the second encoding standard when the encoding device is programmed to comply with the second encoding standard. The techniques can simplify mode selection in support of multiple different intra-prediction encoding standards.

31 Claims, 8 Drawing Sheets

MODE SELECTION TECHNIQUES FOR INTRA-PREDICTION VIDEO ENCODING

TECHNICAL FIELD

This disclosure relates to digital image processing and, more particularly, encoding of images or image frames of a video sequence.

BACKGROUND

Digital video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, and the like. Digital video devices can provide significant improvements over conventional analog video systems in creating, modifying, transmitting, storing, recording and playing full motion video sequences.

A number of different video encoding standards have been established for encoding digital video sequences. The Moving Picture Experts Group (MPEG), for example, has developed a number of standards including MPEG-1, MPEG-2 and MPEG-4. Other standards include the International Telecommunication Union (ITU) H.263 standard, QuickTime™ technology developed by Apple Computer of Cupertino Calif., Video for Windows™ and Windows™ media developed by Microsoft Corporation of Redmond, Wash., Indeo™ developed by Intel Corporation, RealVideo™ from RealNetworks, Inc. of Seattle, Wash., and Cinepak™ developed by Super-Mac, Inc. Updated versions of these standards as well as new standards continue to emerge and evolve, including the ITU H.264 standard and a number of proprietary standards. Many image encoding standards have also been developed for compression of still images, such as the JPEG standard. JPEG stands for "Joint Photographic Experts Group," which is a standardization committee.

Many encoding standards may make use of what is referred to as "intra-prediction encoding" or simply "intra-prediction." In H.263, intra-prediction encoding is also referred to as "advanced intra-coding," and the prediction process is commonly referred to as "AC/DC prediction." In general, intra-prediction encoding refers to an encoding process that exploits redundancy within a given video frame or image in order to compress the amount of data needed to encoded the video frame or image.

Intra-prediction encoding may be used alone as a compression technique, such as for still image compression, but is more commonly implemented along with other video encoding techniques in the compression of video sequences. For example, intra-prediction encoding may be used in conjunction with inter-frame encoding techniques that utilize similarities between successive video frames, referred to as temporal or inter-frame correlation. Inter-frame encoding can provide for inter-frame compression by exploiting data redundancy across frames and converting pixel-based representations of video frames to motion representations. When intra-prediction is used with inter-frame compression, video sequences can be significantly compressed.

In order to support various types of compression, a digital video device typically includes an encoder for compressing digital video sequences, and a decoder for decompressing the digital video sequences. In many cases, the encoder and decoder form an integrated encoder/decoder (CODEC) that operates on blocks of pixels within frames that define the sequence of video images.

For intra-prediction encoding, the encoder may utilize a mode-selection engine, which selects the best mode for intra-prediction of a given frame or image. For example, Annex I of the ITU H.263 encoding standard provides for three possible intra-prediction modes, a horizontal AC/DC mode, a vertical AC/DC mode and a DC only mode. DC modes refer to modes that use the DC coefficient of video blocks, which represents the average value of a video block, whereas AC modes uses AC coefficients, which are the remaining (non-DC) coefficients of the video block. Annex I of the ITU H.263 encoding standard also specifies how the mode selection can be performed. Other standards such as MPEG-4 and the ITU H.264 encoding standard also make use of modes for inter-prediction encoding. Unfortunately, these different standards conventionally require separate mode selection engines in order to support intra-prediction mode selection for the different standards.

SUMMARY

This disclosure describes video encoding techniques and video encoding devices that implement such techniques. The described encoding techniques may be useful for a wide variety of video encoding standards or still-image encoding standards that allow for intra-prediction encoding. The techniques can simplify mode selection in support of different intra-prediction encoding standards. In particular, in an encoding device that supports multiple encoding standards, a single mode selection engine is implemented to perform mode selection for the different encoding standards. The single mode selection engine performs mode selection that is sufficient for each of the standards.

In some cases, the mode selection engine may deviate from mode selection techniques conventionally used with one or more of the standards, but may still provide adequate mode selection performance for such standards. For example, this disclosure specifically contemplates the use of an ITU H.264 mode selection engine to perform mode selection in support of ITU H.263 encoding. This disclosure also specifically contemplates the use of an MPEG-4 mode selection engine to perform mode selection in support of ITU H.263 encoding. In some cases, it is recognized that the mode selection for ITU H.263 encoding can be performed in a spatial domain, which is generally counterintuitive to intra-prediction a DCT domain, as specified in Annex I of the ITU H.263 encoding standard. Experimental research has shown that the mode selection techniques described herein achieve very good levels of compression, while allowing for hardware reductions in the encoding device.

In one embodiment, this disclosure provides an encoding device comprising a mode selection engine that performs mode selection for intra-prediction encoding regardless of whether the encoding device is programmed to comply with first encoding standard or a second encoding standard. The device also includes a first encoder to perform the intra-prediction encoding according to the selected mode in compliance with the first encoding standard when the encoding device is programmed to comply with the first encoding standard, and a second encoder to perform the intra-prediction encoding according to the selected mode in compliance with the second encoding standard when the encoding device is programmed to comply with the second encoding standard.

Additional encoders may also be included, and the number of mode selection engines may be less than the number of encoders.

These and other techniques described herein may be implemented in a digital video device in hardware, software, firmware, or any combination thereof. Additional details of various embodiments are set forth in the accompanying drawings and the description below. Other features, objects and advantages will become apparent from the description and drawings, and from the claims.

DETAILED DESCRIPTION

Figure 1:
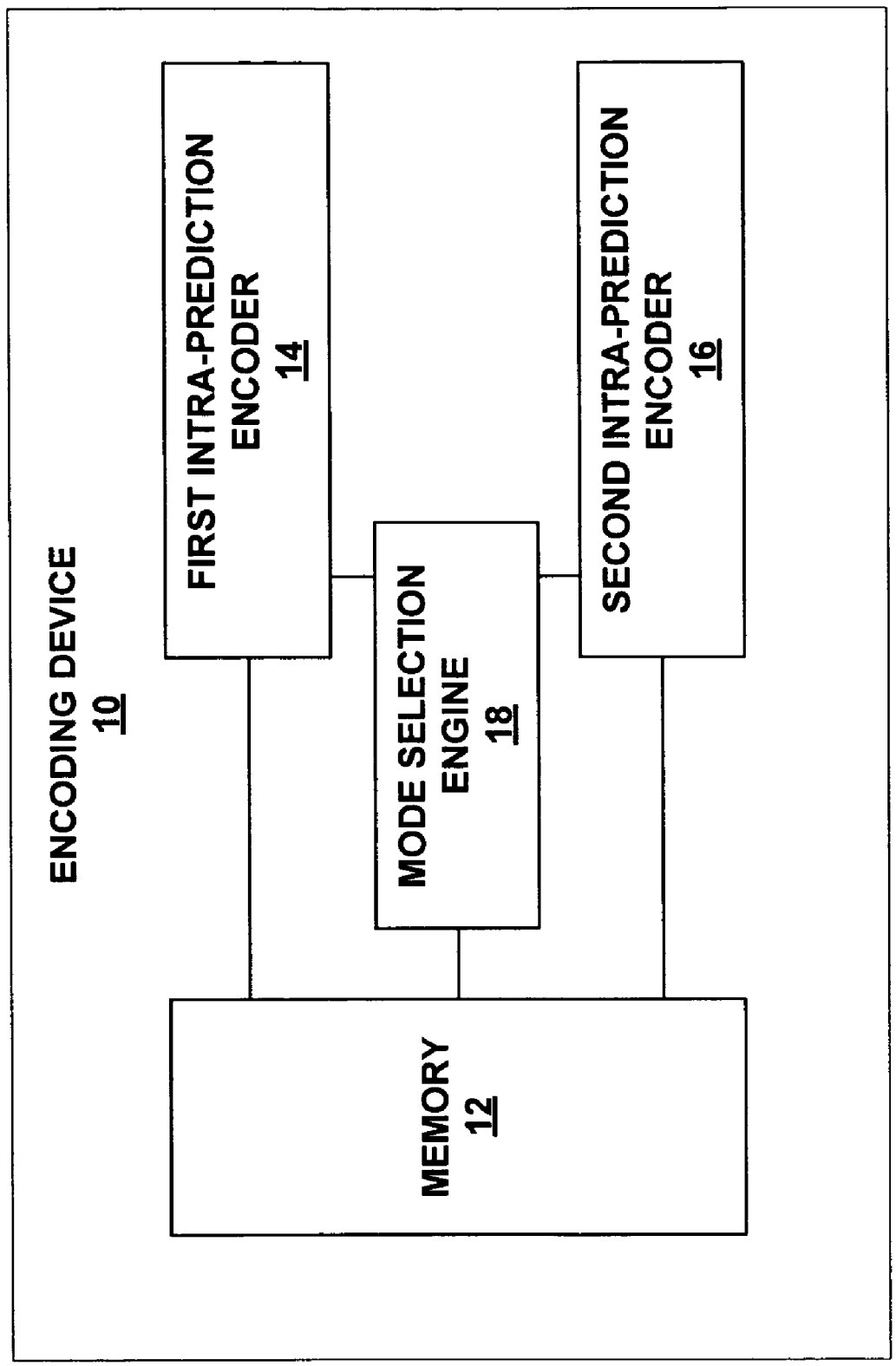
FIG. 1 is a block diagram illustrating an exemplary encoding device according to an embodiment of this disclosure.

FIG. 1 is a block diagram illustrating an exemplary encoding device 10. Encoding device 10 generally refers to any encoding device that can perform intra-prediction encoding techniques. In most cases, encoding device 10 comprises a video encoding device that encodes frames of video sequences. In those cases, encoding device 10 may include a number of additional components, e.g., for performing various inter-frame encoding techniques. However, in some cases, various components of encoding device 10 may perform the intra-prediction encoding techniques, as described herein, on still images. Examples of encoding devices may include digital televisions, digital cameras, digital direct broadcast systems, wireless communication devices, personal digital assistants (PDAs), laptop computers, desktop computers, digital recording devices, cellular or satellite radio telephones, and the like. In general, any device that performs the encoding techniques described herein may be an encoding device.

Encoding device 10 includes a memory 12 that initially stores uncompressed images or uncompressed video frames. In the following description, this disclosure generally refers to operations and techniques that are performed with respect to video frames. It is understood, however, that similar techniques may be applied with regard to compression of still images. A video frame is essentially the same as a still image for purposes of intra-prediction encoding techniques.

Encoding device 10 includes various components for intra-prediction encoding of the frames stored in memory 12, e.g., in order to compress the frames. More specifically, encoding device 10 supports intra-prediction encoding according to two or more different encoding standards. As described in this disclosure, however, a hardware engine designed to support and accelerate mode selection for this intra-prediction encoding is shared and used regardless of which of the two or more different encoding standards are used at a given time. Encoding device 10 may be programmable to allow a vendor to program the specific standard to be used, yet flexible so that the vendor can select from two or more standards. Although generally described as including two encoders, encoding device 10 may include any number of encoders. The number of mode selection engines may be less than the number of encoders.

As illustrated in FIG. 1, encoding device 10 includes a first intra-prediction encoder 14 and a second intra-prediction encoder 16. First intra-prediction encoder 14 performs intra-prediction encoding according to a first encoding standard, whereas second intra-prediction encoder 16 performs intra-prediction encoding according to a second encoding standard. First intra-prediction encoder 14 and a second intra-prediction encoder 16 each may be implemented by a combination of hardware, software, and firmware. In particular, encoders 14, 16 may be implemented using one or more digital signal processors (DSPs), application specific integrated circuits (ASICs), field programmable logic arrays (FPGAs), general purpose processors, or any combinations thereof.

Intra-prediction encoding refers to a encoding process that exploits redundancy within a given video frame or image in order to compress the amount of data needed to encoded the video frame or image. Encoder 10 allows for intra-prediction encoding according to at least two different encoding standards. In each case, however, the intra-prediction may be used alone as a compression technique, such as for still image compression, or may be used as part of a video encoding technique that also performs inter-frame correlation, and/or other encoding techniques.

In accordance with various encoding standards, a mode selection process is performed as part of the intra-prediction encoding process. Encoding device 10 includes a mode selection engine 18 to perform this mode selection for intra-prediction encoding. For example, mode selection engine 18 may select an intra-prediction mode, based on a desirable encoding rate, compression ratio or encoding efficiency needed at any given time. However, unlike conventional encoders, encoding device 10 uses the same mode selection engine 18 to facilitate mode selection for intra-prediction encoder 14 and a second intra-prediction encoder 16. Mode selection engine 18 may comprise a hardware component used with either of the first intra-prediction encoder 14 and a second intra-prediction encoder 16. Mode selection hardware, for example, can accelerate the mode selection process. Moreover, a vendor may be able to program encoding device 10 to support either of the two standards associated with either of encoders 14 and 16, but mode selection engine 18 is used regardless of this selection. Accordingly, use of a single mode selection engine 18 can result in a reduction in hardware in an encoding device that supports multiple standards.

Mode selection is generally a process of identifying one portion of the frame that will be used to encode and compress another portion of the frame. As an example, the ITU H.263 video encoding standard includes an Annex I, which describes a preferred mode selection process in compliance with that standard. The mode selection process described in Annex I of H.263 defines how the coding of "intra" video blocks is performed. The coding efficiency of intra video blocks is said to be improved by allowing flexibility in the prediction modes. Annex I of H.263 defines three different prediction modes. Other standards documentation may define three prediction modes, or possibly more, but in any case, the suggested manner for selecting these different modes typically varies considerably between standards documentation.

Among the three prediction modes described in Annex I for the ITU H.263 standard, horizontal DC and AC (Mode 2), vertical DC and AC (Mode 1), and DC only (Mode 0), the mode selector of the encoder typically determines the best mode using the minimum sum of absolute different (SAD) criterion. The intra-prediction mode selection process, as described in Annex I for the ITU H.263 standard, can be better understood with reference to FIG. 2. As used herein, DC modes refer to a mode that uses the DC coefficient of video blocks, which represents the average value of a video block, whereas AC modes use AC coefficients, which are the remaining (non-DC) coefficients of the video block.

Figure 2:
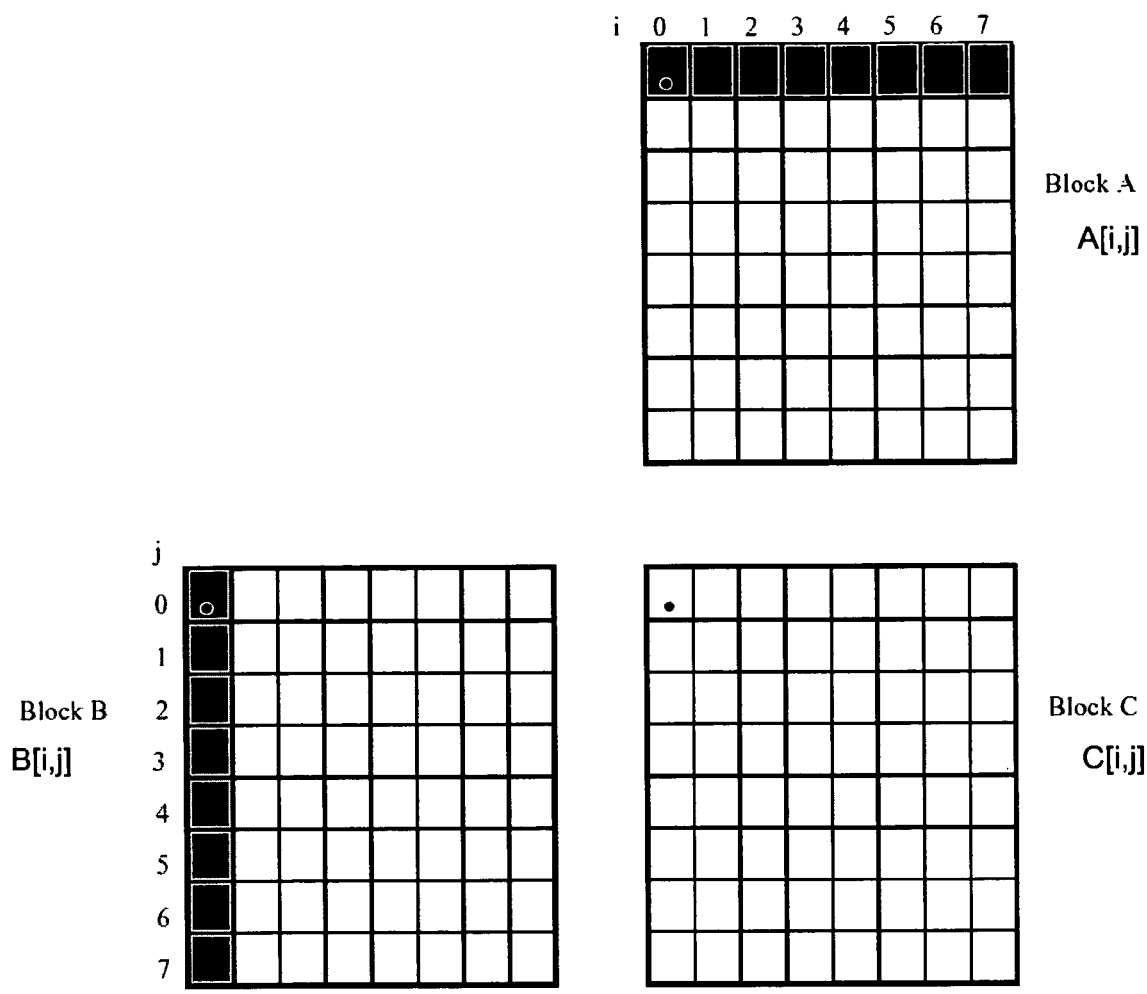
FIG. 2 is a diagram used to help explain the encoding process described in Annex I for the ITU H.263 standard.

Referring to FIG. 2, C [i, j] denotes the discrete cosine transform (DCT) coefficients of the current block before prediction, C' [0, 0] denotes the predicted DC component of the current block using Mode 0, A'[i, 0], i=0, 1, ... 7, denotes the predicted top row of the current block using Mode 1, and B'[0, j], j=0, 1, ... 7, denotes the predicted left column of the current block using Mode 2.

SAD0, SAD1, SAD2 represent the sum of absolute difference (SAD) metric for Mode 0, 1, and 2 respectively. The SADs for one 8×8 luminosity (luma) or chromaticity (chroma) block are calculated as below:

$$SAD0_{8\times 8} = abs(C[0,0] - C'[0,0]) + 32\sum_{i=1}^{7} abs(C[i,0]) + 32\sum_{j=1}^{7} abs(C[0,j])$$

$$SAD1_{8\times 8} = 32\sum_{i=0}^{7} abs(C[i,0] - A'[i,0]) + 32\sum_{j=1}^{7} abs(C[0,j])$$

$$SAD2_{8\times 8} = 32\sum_{i=1}^{7} abs(C[i,0]) + 32\sum_{j=0}^{7} abs(C[0,j] - B'[0,j])$$

Then, the SAD of a given block is the sum of $SAD_{8\times 8}$'s for six blocks (four luma and two chroma). The best mode is the one that results in the minimum SAD.

The above algorithm, consistent with the suggested standards documentation for ITU H.263 standard requires the DCT coefficients, block C [i,j], of the current block. In other words, the intra-prediction process including the mode selection process is performed, in accordance with the suggested standards documentation for ITU H.263 standard, in the DCT domain rather than a spatial domain. In that case, intra-prediction mode selection must be implemented after the DCT transformation of pixels in the spatial domain, but before the quantization on the DCT coefficients is performed. However, DCT coefficients are not typically generated at the time when mode selection is performed in accordance with intra-prediction with other standards, such as the ITU H.264 standard. Accordingly, mode selection decisions, consistent with the proposed standards documentation for intra-prediction in the ITU H.263 standard using the SAD between the DCT coefficients of the current block and the predictor block, are not feasible for a mode selection engine designed for standards such as ITU H.264 standard. For MPEG-4, intra-prediction and mode selection for intra-prediction are typically performed in the DCT domain, but in a much simpler fashion than ITU H.263.

This disclosure contemplates at least two different alternatives for ITU H.263 mode selection. In some cases, the ITU H.263 mode selection may not rely on the DCT coefficients of the current block. Accordingly, this disclosure may allow a common mode selection engine to perform mode selection regardless of whether the ITU H.263 standard or another standard is currently being supported.

In MPEG-4, the intra-prediction mode for the current block is typically determined from the coefficients of adjacent blocks, which does not depend on any coefficient of the current block. In MPEG-4, a mode for each 8×8 block is determined. In contrast to MPEG-4, the proposed mode selection scheme for the ITU H.263 standard only needs a determination of the mode for the top left sub-block of a 16 by 16 "macroblock," which is used for the entire macroblock.

Figure 3:
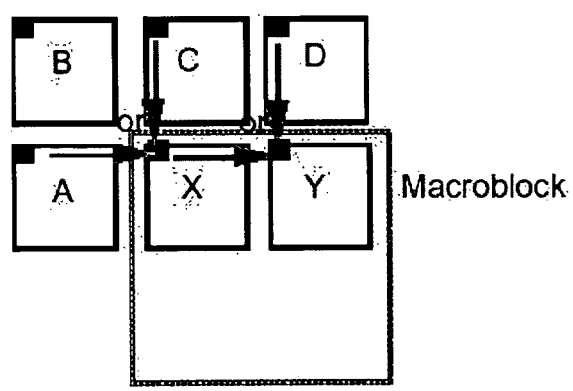
FIG. 3 is a diagram used to help explain the encoding process that uses mode selection similar to that described in MPEG-4 documentation.

Referring to FIG. 3, and using F_X[i][j] to denote the coefficient of block X, where block X is the top left block of the current macroblock that is being processed, the intra-prediction mode selection process according to MPEG-4 may be summarized according to the following pseudo-code, referred to as "algorithm 1":

---

If (any of the blocks A, B or C are outside of the current video segment)
Use mode 0;
else if ( |F_A[0][0] − F_B[0][0]| < |F_B[0][0] − F_C[0][0]|)
predict from block C (mode 1);
else
predict from block A (mode 2);
end

---

In particular, algorithm 1 illustrates how mode selection can be performed for MPEG-4 compliant encoders. Briefly, mode 0 is used when neighboring blocks are outside of a current video segment. A vertical prediction is used if the average DC difference between blocks B and A is smaller than the average difference between blocks B and C. A horizontal prediction is used if the average difference between blocks B and C is smaller than the average difference between blocks B and A.

Moreover, Algorithm 1 can be slightly modified, as follows, to achieve better performance. The following is referred to as "algorithm 2"

---

If (any of the blocks A, B or C are outside of the current video segment)
Use mode 0;
else if ( |F_A[0][0] − F_B[0][0]| < |F_B[0][0] − F_C[0][0]|
&& |F_A[0][0] − F_B[0][0]| / F_A[0][0] < .03 )
predict from block C (mode 1);
else if ( |F_B[0][0] − F_C[0][0]|) / F_C[0][0] < .03 )
predict from block A (mode 2);
else
Use mode 0;
end

---

Compared with Algorithm 1, Algorithm 2 poses an additional condition that the average DC difference between the two neighboring blocks has to be lower than a threshold, in order to perform either horizontal or vertical predication, instead of DC prediction. In other words, in Algorithm 2, mode 0 is used when neighboring blocks are outside of a current video segment, or when the average DC difference between the two neighboring blocks is not lower than a threshold. The intra-prediction mode selection process in MPEG-4 has the advantage of low complexity relative to mode selection processes for other standards such as the ITU H.263 standard.

In the ITU H.264 recommended standards documentation, the intra-prediction is based on pixels instead of DCT coefficients, unlike the ITU H.263 standards recommendation. However, as described in greater detail below, the best 16×16 luma mode can be determined in accordance with the ITU H.264 standards documentation, as the mode for ITU H.263 intra-prediction, without a significant loss of compression or significant degradation of peak signal-to-noise ratio (PSNR). This result is surprising given that ITU H.263 intra-prediction is suggested to be performed on DCT coefficients, rather than pixels in the spatial domain.

In accordance with the ITU H.264 recommended standards documentation, there are four 16×16 luma modes for the luma component of a macroblock: DC, vertical, horizontal, and planar. The vertical, horizontal and planar modes use AC coefficients of video blocks. The first three modes: DC, vertical and horizontal, can be used to correspond to the modes for the ITU H.263 standard for intra-prediction. In some cases, only the first three modes are used for ITU H.264 mode selection as well, as the planar mode may be more complicated to calculate, particularly for hand-held devices where power consumption is a concern and processing power is limited.

Referring again to FIG. 1, encoding device 10 includes a mode selection engine 18 that performs mode selection for intra-prediction encoding regardless of whether the encoding device is programmed to comply with a first encoding standard or a second encoding standard. A first encoder 14 performs the intra-prediction encoding according to the selected mode in compliance with the first encoding standard when encoding device 10 is programmed to comply with the first encoding standard. A second encoder 16 performs the intra-prediction encoding according to the selected mode in compliance with the second encoding standard when the encoding device is programmed to comply with the second encoding standard. By way of example, encoding device 10 may comprise a handset that can be programmed to comply with either the first encoding standard or the second encoding standard. Accordingly, a vendor may program encoding device 10 to comply with either of the first or second standards, providing greater flexibility to the vendor. Moreover, since first encoder 14 and second encoder 16 use a common mode selection engine 18, encoding device 10 can be simplified relative to conventional dual-standard encoding devices with mode selection hardware to accelerate the mode selection process. Other examples of encoding device 10 include digital televisions, digital direct broadcast systems, wireless communication devices, personal digital assistants (PDAs), laptop computers, desktop computers, digital cameras, digital recording devices, cellular or satellite radio telephones, and the like.

In some embodiments, mode selection engine 18 may form part of first encoder 14. In that case, second encoder 16 implements mode selection engine 18 from first encoder 14 when encoding device 10 is programmed to comply with the second encoding standard. In other words, although illustrated as separate components, mode selection engine 18 may form a hardware component of one of the encoders, and the other of the encoders can also use that mode selection hardware. A wide variety of other components may also be included in encoding device 10, but are not specifically illustrated for simplicity. Additional encoders may also be included. Regardless of the number of encoders, however, two or more of the encoders may share a mode selection engine, as described herein.

Figure 4:
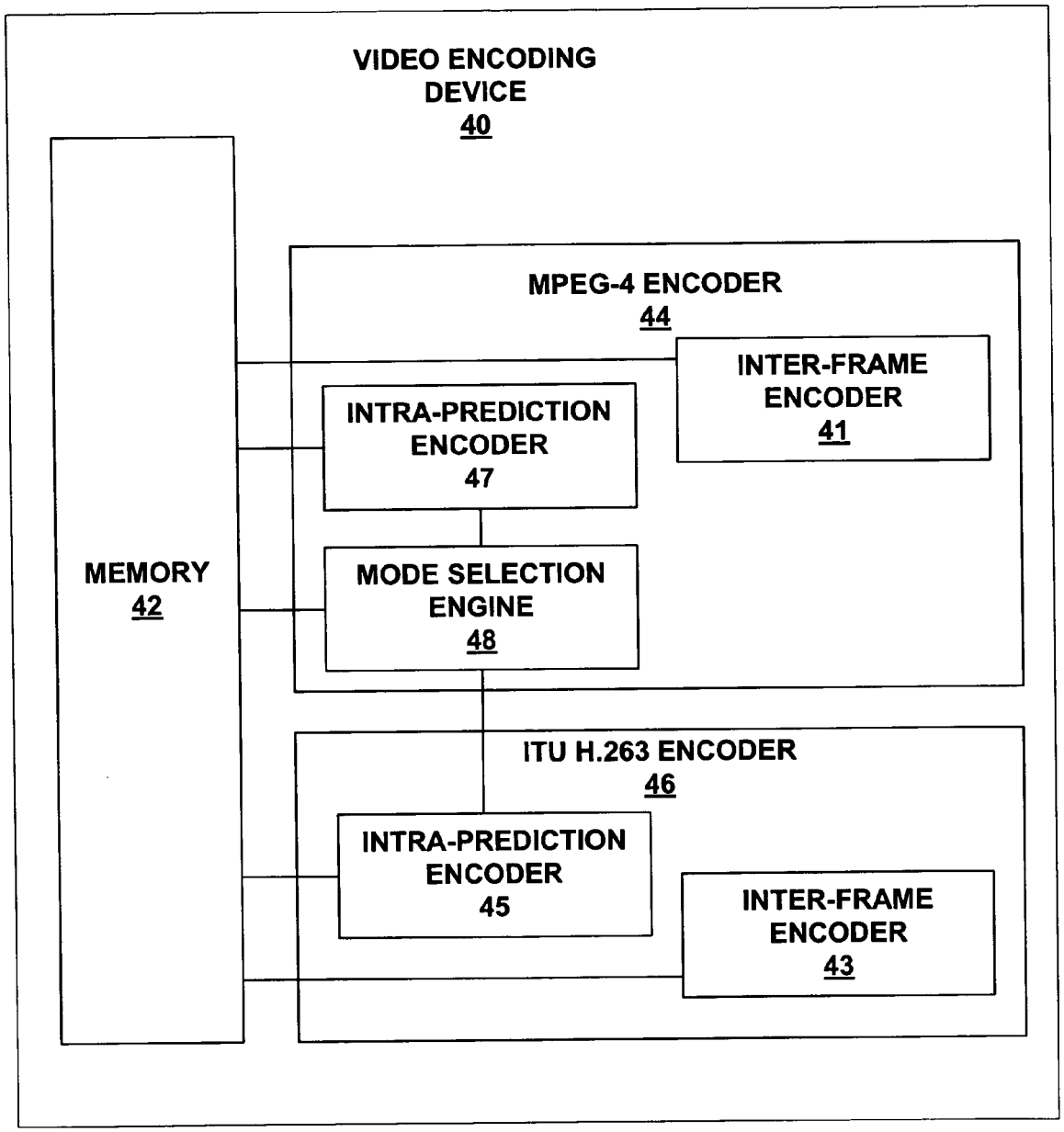
FIG. 4 is a block diagram of a video encoding device that supports MPEG-4 compliant encoding and ITU H.263 compliant encoding.

FIG. 4 is more specific block diagram of a video encoding device 40 that supports MPEG-4 compliant encoding and ITU H.263 compliant encoding. As shown in FIG. 4, video encoding device 40 includes a memory 42 that initially stores uncompressed images or uncompressed video frames. Throughout the encoding process, memory 42 may also be used to store video data as it is encoded and compressed.

Video device 40 includes an MPEG-4 encoder 44 and an ITU H.263 encoder 46. MPEG-4 encoder 44 encodes video sequences in compliance with the MPEG-4 video encoding standard, and likewise, ITU H.263 encoder 46 encodes video sequences in compliance with the ITU H.263 video encoding standard. Each of these standards make use of both intra-prediction encoding and intra-frame encoding. Accordingly, MPEG-4 encoder 44 includes an intra-prediction encoder 47 and an inter-frame encoder 41, and ITU H.263 encoder 46 includes an intra-prediction encoder 45 and an inter-frame encoder 43. Each of these components generally comply with the respective encoding standards associated with encoders 44 and 46.

As outlined above, one process that is implemented during the intra-prediction encoding is intra-prediction mode selection. In particular, intra-prediction mode selection is contemplated for both MPEG-4 encoding and ITU H.263 encoding, although the recommended standards documentation for these different standards specify different ways to perform the mode selection. The suggested MPEG-4 intra-prediction mode selection is much less complex than the suggested ITU H.263 intra-prediction mode selection.

MPEG-4 encoder 44 includes a mode selection engine 48. Mode selection engine 48 comprises hardware designed to accelerate the mode selection process. Moreover, mode selection engine 48 performs mode selection in substantial conformity with the suggested standards documentation for the MPEG-4 standard. Mode selection engine 48 performs mode selection in a DCT domain, but in a simplified manner relative to ITU H.263 suggested documentation, e.g., without requiring the DCT coefficients from the current block being coded.

ITU H.263 encoder 46 does not include its own mode selection engine. Instead, for mode selection, ITU H.263 encoder 46 implements mode selection engine 48 of MPEG-4 encoder 44. This disclosure recognizes, however, that mode selection for ITU H.263 according to MPEG-4 mode selection, provides acceptable results for ITU H.263 mode selection.

Encoding device 40 may receive programming instructions, e.g., from a vendor, specifying the encoding standard from a plurality of encoding standards. For example, the vendor may specify either MPEG-4 encoding or ITU H.263 encoding. In either case, intra-prediction encoding is performed in compliance with the selected encoding standard. However, mode selection, as outlined above may be performed as described in suggested MPEG-4 documentation, regardless of whether MPEG-4 encoding or ITU H.263 encoding is specified by the vendor.

Figure 5:
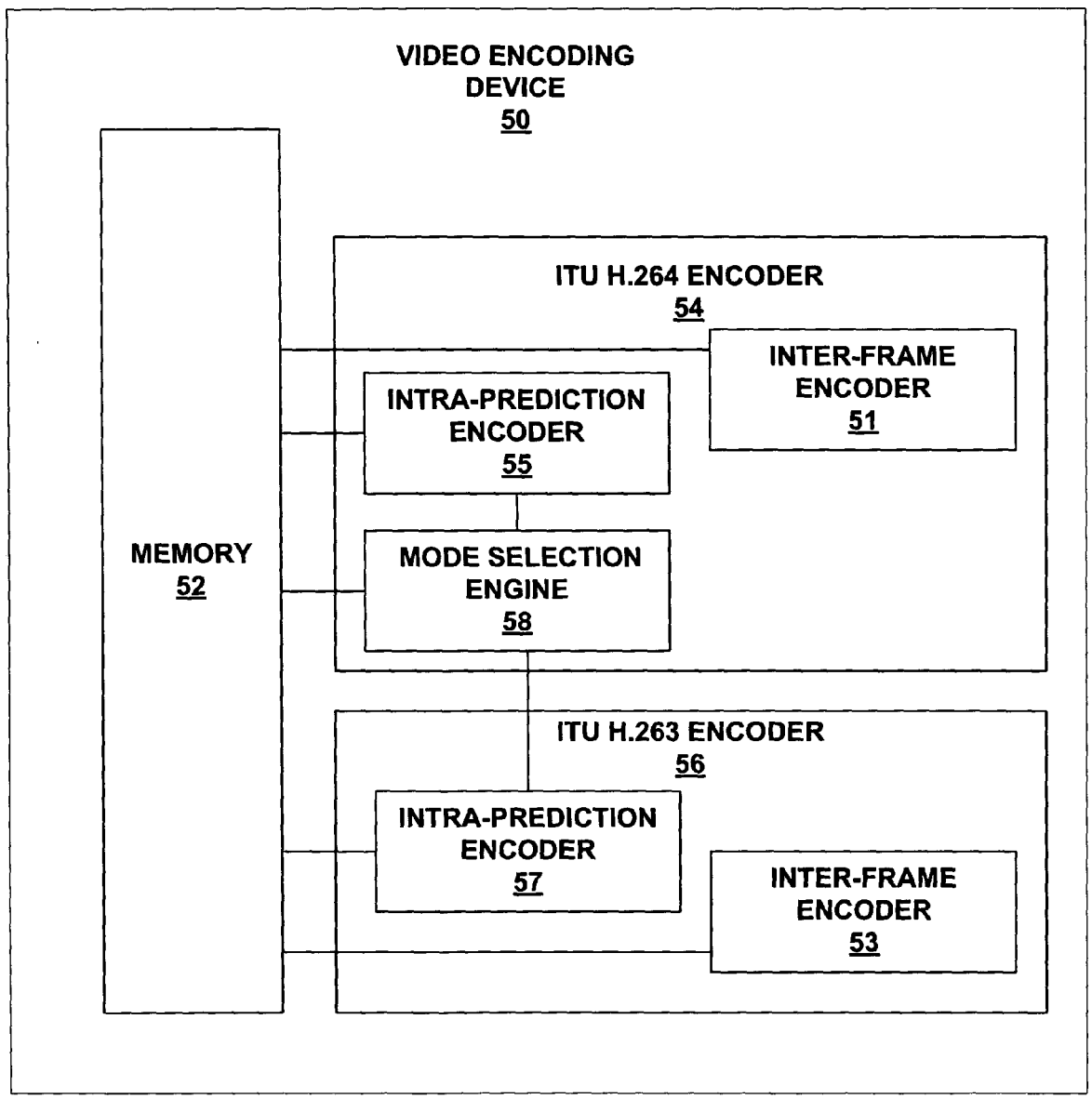
FIG. 5 is a diagram of a video encoding device that supports ITU H.264 compliant encoding and ITU H.263 compliant encoding.

FIG. 5 is more specific block diagram of a video encoding device 50 that supports ITU H.264 compliant encoding and ITU H.263 compliant encoding. As shown in FIG. 5, video encoding device 50 includes a memory 52 that initially stores uncompressed images or uncompressed video frames. Throughout the encoding process, memory 52 may also be used to store video data as it is encoded and compressed. Consistent with the embodiment of FIG. 5, a method according to this disclosure may comprise performing mode selection in a spatial domain for intra-prediction encoding in an encoding device programmed to comply with an encoding standard having suggested standards documentation that specifies intra-prediction in a discrete cosine transform (DCT) domain.

Video device 50 includes an ITU H.264 encoder 54 and an ITU H.263 encoder 56. ITU H.264 encoder 54 encodes video sequences in compliance with the ITU H.264 video encoding standard, and likewise, ITU H.263 encoder 56 encodes video sequences in compliance with the ITU H.263 video encoding standard. Each of these standards make use of both intra-prediction encoding and intra-frame encoding. Accordingly, ITU H.264 encoder 54 includes an intra-prediction encoder 55 and an inter-frame encoder 51, and ITU H.263 encoder 56 includes an intra-prediction encoder 57 and an inter-frame encoder 53. Each of these components generally comply with the respective encoding standards associated with encoders 54 and 56.

The ITU H.264 recommended standards documentation specifies that intra-prediction should be performed with respect to pixels in the spatial domain. Again, the suggested ITU H.263 intra-prediction, in contrast, is performed in with respect to coefficients in the discrete cosign transform (DCT) domain. In accordance with the ITU H.264 recommended standards documentation, there are four 16×16 luma modes for the luma component of a macroblock: DC, vertical, horizontal, and planar. The first three: DC, vertical and horizontal, can be used to correspond to the modes for the ITU H.263 standard for intra-prediction.

ITU H.264 encoder 54 includes a mode selection engine 58. Mode selection engine 58 comprises hardware designed to accelerate the mode selection process. Moreover, mode selection engine 58 performs mode selection in substantial conformity with the suggested standards documentation for the ITU H.264 standard. In some cases, however, only the first three modes are used for ITU H.264 mode selection, as the planar mode may be more complicated to process. Avoiding the use of planar mode for ITU H.264 mode selection can help simplify the hardware of video encoding device 50, reduce power consumption, and extend battery life. In any case, mode selection engine 58 performs mode selection in a spatial domain, i.e., based on pixel values in the spatial domain.

ITU H.263 encoder 56 does not include its own mode selection engine. Instead, for mode selection, ITU H.263 encoder 56 implements mode selection engine 58 of ITU H.264 encoder 54. Again, this is counterintuitive, as the recommended standards documentation for the ITU H.263 standard specifies that intra-prediction is to be performed in a DCT domain, i.e., based on DCT coefficients. This disclosure recognizes, however, that mode selection for ITU H.263 in the spatial domain, provides acceptable results.

In accordance with the ITU H.264 recommended standards documentation, there are four 16×16 luma modes for the luma component of a macroblock: DC, vertical, horizontal, and planar. The first three: DC, vertical and horizontal, can be determined by mode selection engine 58 and used by ITU H.263 encoder 56 to correspond to the modes for the ITU H.263 standard for intra-prediction. Moreover, in some cases, only the first three modes are used by ITU H.264 encoder 54 for ITU H.264 mode selection, as the planar mode may be more complicated to calculate, particularly for hand-held devices where power consumption and processing power are more limited. In some embodiments, the planar mode can be calculated by mode selection engine 58 for use by encoder 54, but if device 50 is programmed to support ITU H.263 encoding, mode selection engine 58 may avoid such calculations associated with a planar mode.

Figure 6:
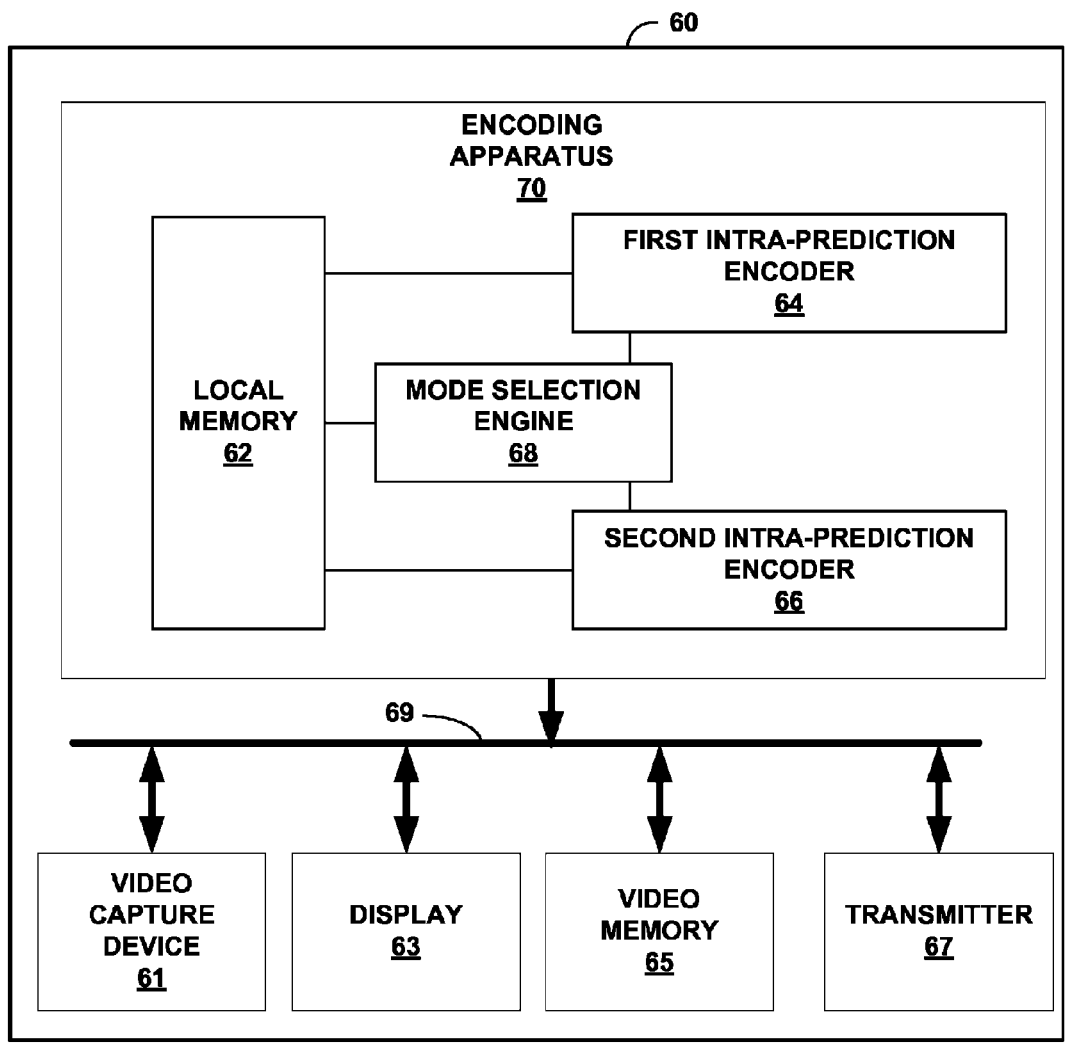
FIG. 6 is another block diagram illustrating an exemplary encoding device according to an embodiment of this disclosure.

FIG. 6 is a block diagram of video encoding device 60, which supports video encoding according to two or more encoding standards. Video encoding device 60 is very similar to video encoding device 10 of FIG. 1, but includes several additional components. Encoding apparatus 70 may comprise a chip set packaged into device 60 along with a video capture device 61, a display 63, video memory 65 and transmitter 67. Transmitter 67 may be a wireless transmitter. These various components may be communicatively coupled via a communication bus 69. Other components may also be included.

Encoding apparatus 70 includes a local high speed memory 62, loaded with video sequences from off-chip video memory 65. The video sequences are encoded, as described herein. Device 60 supports multiple encoding standards, and a vendor can select an encoding standard to be used.

Encoding apparatus 70 includes a mode selection engine 68 that performs mode selection for intra-prediction encoding regardless of whether the encoding apparatus 70 is programmed to comply with first encoding standard or a second encoding standard. Mode selection engine 68 may comprise hardware implemented to accelerate the mode selection process. Apparatus 70 also includes a first intra-prediction encoder 64 that performs the intra-prediction encoding according to the selected mode in compliance with the first encoding standard when apparatus 70 is programmed to comply with the first encoding standard, and a second intra-prediction encoder 66 that performs the intra-prediction encoding according to the selected mode in compliance with the second encoding standard when the encoding device is programmed to comply with the second encoding standard. Encoders 64 and 66 each may comprise any combination of hardware, software, and firmware. Encoders 64, 66 may also be implemented by one or more digital signal processors (DSPs), application specific integrated circuits (ASICs), FPGAs, general purpose processors, or any combinations thereof.

Video capture device 61 may comprise a video camera to capture video sequences and store the captured sequences in video memory 65. In particular, video capture device 61 may include a charge coupled device (CCD), a charge injection device, an array of photodiodes, a complementary metal oxide semiconductor (CMOS) device, or any other photosensitive device capable of capturing video images or digital video sequences. Display 63 may display decoded video sequences, and transmitter 67 may transmit encoded video sequences. In some cases, video capture device captures video sequences, which are encoded according to the selected standard and then transmitted in real-time by transmitter 67. Mode selection engine 68 can improve this real-time encoding by accelerating the mode selection process during intra-prediction encoding.

Video memory 65 typically comprises a relatively large memory space. Video memory 65, for example, may comprise dynamic random access memory (DRAM), or FLASH memory. In other examples, video memory 65 may comprise a non-volatile memory or any other data storage device. In contrast, local memory 62 may comprise a smaller and faster memory space relative to video memory 65. By way of example, local memory 62 may comprise synchronous random access memory (SRAM). Local memory 62 may also comprise "on-chip" memory integrated with the other components of apparatus 70 to provide for very fast access to data during the processor-intensive encoding process.

Figure 7:
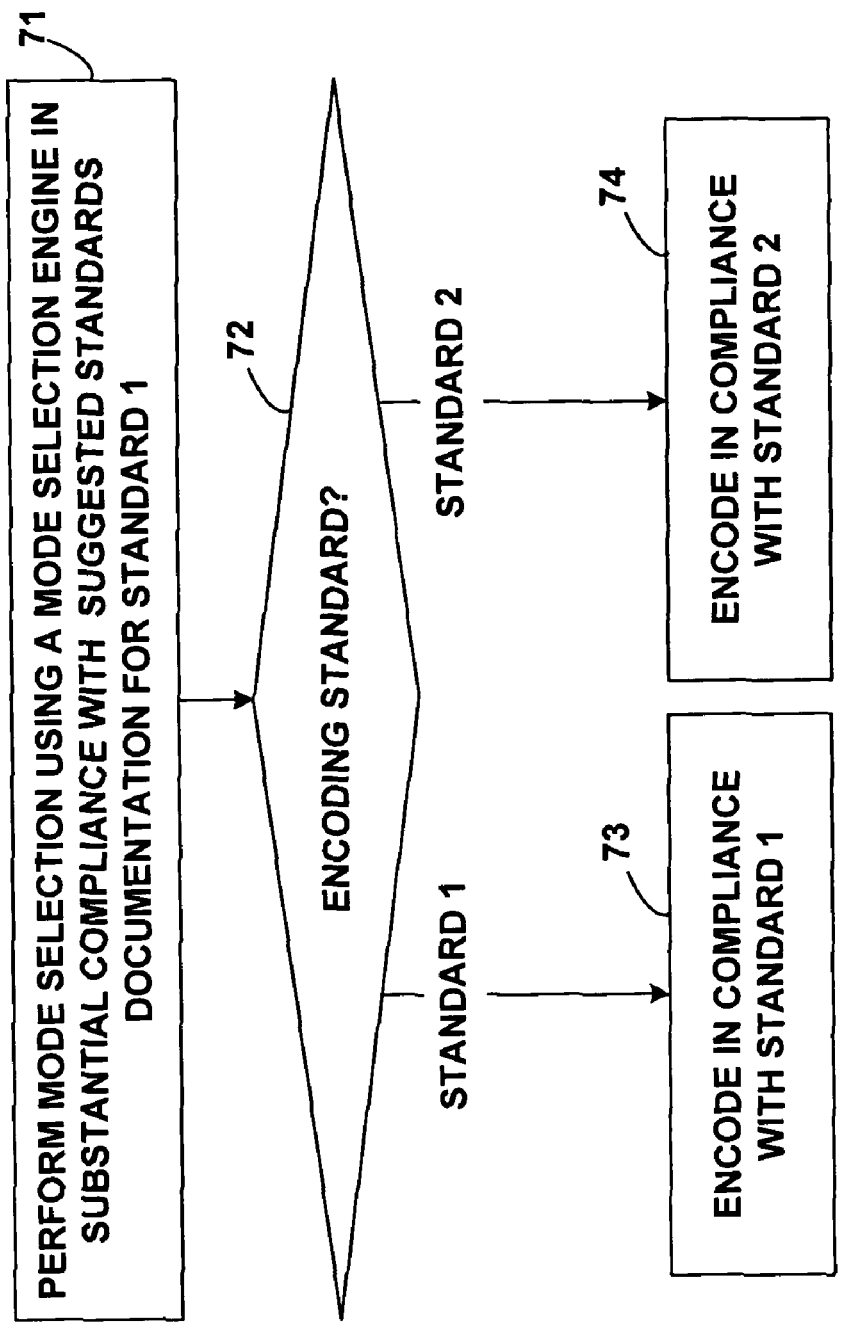
FIG. 7 is a flow diagram illustrating a process consistent with the teaching of this disclosure.
Figure 8:
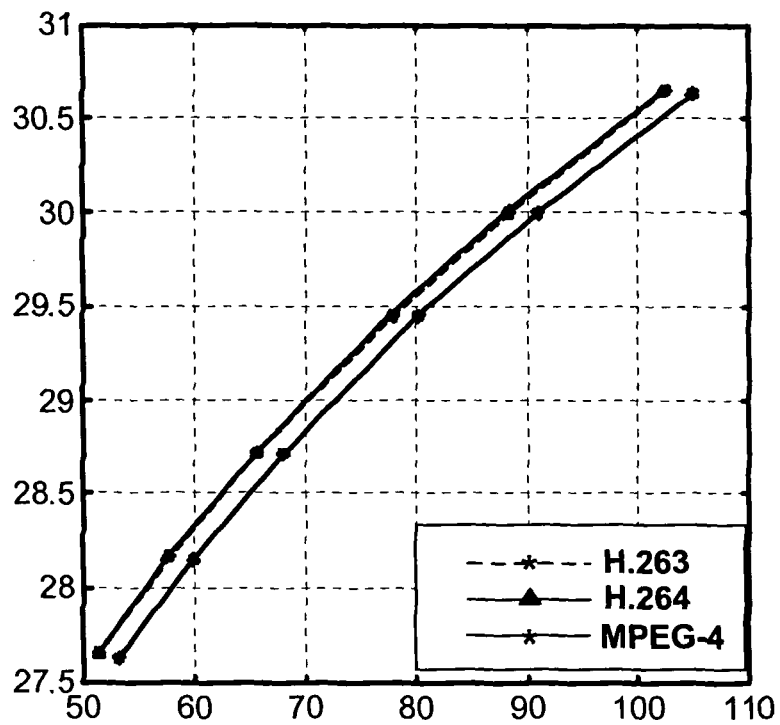
FIGS. 8-11 are graphs of experimental results that confirm that the mode selection techniques described herein achieve very good results
Figure 9:
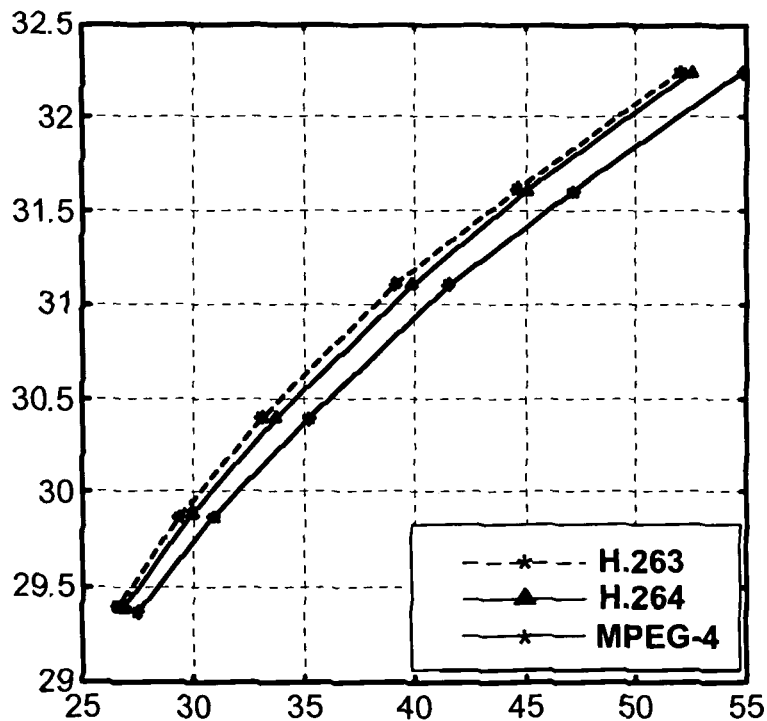
Figure 10:
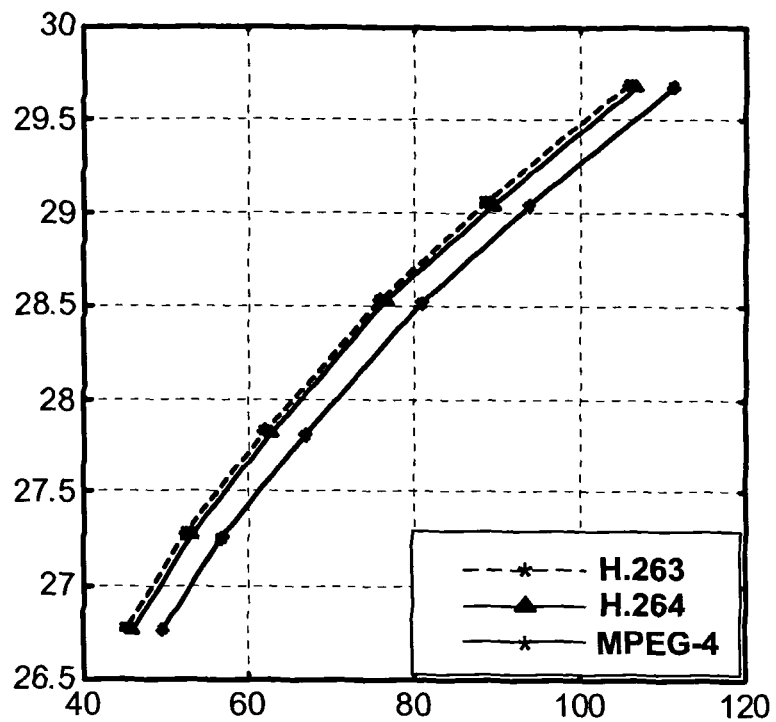
Figure 11:
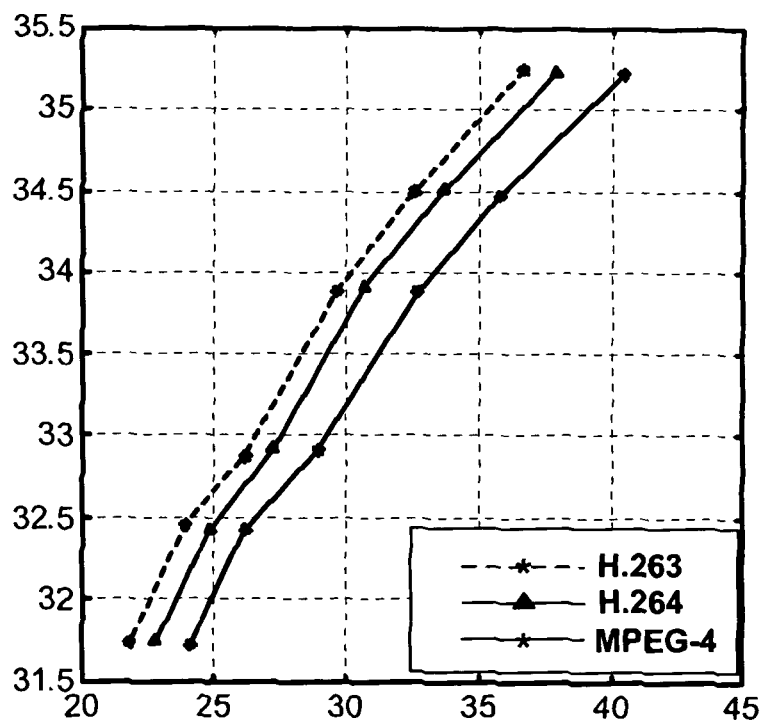

FIG. 7 is a flow diagram illustrating a process consistent with the teaching of this disclosure. FIG. 7 will be described with reference to encoding device 10 of FIG. 1. As shown in FIG. 7, device 10 performs mode selection using mode selection engine 18 in substantial compliance with a first encoding standard (standard 1) (71). If device 10 is programmed to encode according to the first standard (standard 1 branch of 72), then device encodes the frames in compliance with standard 1 (73). If device 10 is programmed to encode according to the second standard (standard 2 branch of 72), then device encodes the frames in compliance with standard 2 (74). As outlined above, the mode selection engine 18 can be shared for both standards, even if the mode selection engine 18 performs such mode selection in domain that is different than the intra-prediction domain for one of the standards. Tables 1-4 below and the graphs of FIGS. 8-11 provide experimental results that confirm that the mode selection techniques described herein achieve very good results.

Tables 1-4 below correspond to the graphs of FIGS. 8-11 respectively. In accordance with this disclosure, four video sequences were tested during ITU H.263 encoding. The sequences were named Foreman, Mother, Coast-guard, and Claire to distinguish the different sequences. Each sequence consisted of 300 frames. Each sequence was intra-prediction encoded in compliance with the ITU H.263 standard using various mode decision schemes substantially consistent with the recommended standards documentation for H.263, MPEG-4 and ITU H.264. The Intra period was 5 frames. The peak signal to noise ratios (PSNR), as well as the rate increase due to the use of MPEG-4 schemes or ITU H.264 schemes instead of the minimum SAD method, are listed in tables 1-4. The respective rate-distortion curves for each sequence are plotted in FIGS. 8-11

In the tables and FIGS., "H.263" refers to the ITU H.263 encoding when minimum SAD mode selection was used, as outlined in Annex I of the ITU H.263 standards documentation. "MPEG-4" refers to the ITU H.263 encoding when a slightly modified mode selection technique relative to the MPEG-4 recommended standards documentation was used, consistent with Algorithm 2 (above). "H.264" refers to the encoding when the first three modes (excluding planar mode) of the ITU H.264 recommended standards documentation were used for mode selection in ITU H.263 encoding. The "Rate inc." for MPEG-4 and H.264 identifies the rate increase relative to encoding with H.263 mode selection.

TABLE 1

Foreman

| | H.263 | | MPEG-4 | | | H.264 | | |
|---|---|---|---|---|---|---|---|---|
| QP | PSNR (dB) | Rate (Kbps) | PSNR (dB) | Rate (Kbps) | Rate inc (%) | PSNR (dB) | Rate (Kbps) | Rate inc (%) |
| 14 | 30.65 | 102.4 | 30.63 | 104.8 | 2.34 | 30.65 | 102.1 | −0.31 |
| 16 | 30.01 | 88.4 | 29.99 | 90.9 | 2.85 | 30.00 | 88.1 | −0.30 |
| 18 | 29.45 | 77.8 | 29.44 | 80.2 | 3.02 | 29.45 | 77.6 | −0.25 |
| 21 | 28.72 | 65.6 | 28.71 | 68.1 | 3.70 | 28.73 | 65.6 | −0.08 |
| 24 | 28.17 | 57.7 | 28.15 | 59.8 | 3.67 | 28.17 | 57.5 | −0.25 |
| 27 | 27.65 | 51.3 | 27.63 | 53.1 | 3.54 | 27.65 | 51.3 | 0.02 |

TABLE 2

Mother

| | H.263 | | MPEG-4 | | | H.264 | | |
|---|---|---|---|---|---|---|---|---|
| QP | PSNR (dB) | Rate (Kbps) | PSNR (dB) | Rate (Kbps) | Rate inc (%) | PSNR (dB) | Rate (Kbps) | Rate inc (%) |
| 14 | 32.24 | 52.0 | 32.24 | 54.8 | 5.57 | 32.24 | 52.5 | 1.00 |
| 16 | 31.62 | 44.7 | 31.61 | 47.1 | 5.54 | 31.61 | 45.1 | 0.95 |
| 18 | 31.10 | 39.1 | 31.11 | 41.5 | 6.20 | 31.11 | 39.8 | 1.92 |
| 21 | 30.41 | 33.1 | 30.39 | 35.2 | 6.31 | 30.40 | 33.7 | 1.82 |
| 24 | 29.87 | 29.4 | 29.87 | 30.9 | 5.32 | 29.89 | 30.0 | 2.03 |
| 27 | 29.40 | 26.6 | 29.37 | 27.5 | 3.52 | 29.39 | 26.9 | 1.34 |

TABLE 3

Coastguard

| | H.263 | | MPEG-4 | | | H.264 | | |
|---|---|---|---|---|---|---|---|---|
| QP | PSNR (dB) | Rate (Kbps) | PSNR (dB) | Rate (Kbps) | Rate inc (%) | PSNR (dB) | Rate (Kbps) | Rate inc (%) |
| 14 | 29.69 | 105.6 | 29.67 | 111.2 | 5.28 | 29.68 | 106.6 | 0.95 |
| 16 | 29.06 | 88.4 | 29.04 | 93.8 | 6.09 | 29.04 | 89.6 | 1.33 |
| 18 | 28.54 | 75.7 | 28.52 | 80.8 | 6.72 | 28.52 | 76.6 | 1.17 |
| 21 | 27.83 | 61.8 | 27.81 | 66.6 | 7.73 | 27.82 | 62.7 | 1.43 |
| 24 | 27.28 | 52.4 | 27.26 | 56.7 | 8.17 | 27.27 | 53.1 | 1.29 |
| 27 | 26.77 | 45.1 | 26.76 | 49.4 | 9.50 | 26.76 | 45.8 | 1.48 |

TABLE 4

| | Claire | | | | | | | |
|---|---|---|---|---|---|---|---|---|
| | H.263 | | MPEG-4 | | | H.264 | | |
| QP | PSNR (dB) | Rate (Kbps) | PSNR (dB) | Rate (Kbps) | Rate inc (%) | PSNR (dB) | Rate (Kbps) | Rate inc (%) |
| 14 | 35.24 | 36.6 | 35.22 | 40.4 | 10.37 | 35.22 | 37.9 | 3.55 |
| 16 | 34.50 | 32.6 | 34.46 | 35.8 | 9.96 | 34.50 | 33.7 | 3.58 |
| 18 | 33.88 | 29.6 | 33.88 | 32.7 | 10.35 | 33.91 | 30.6 | 3.55 |
| 21 | 32.87 | 26.2 | 32.91 | 28.9 | 10.31 | 32.92 | 27.2 | 3.80 |
| 24 | 32.45 | 23.9 | 32.42 | 26.2 | 9.45 | 32.42 | 24.9 | 4.03 |
| 27 | 31.74 | 21.8 | 31.71 | 24.1 | 10.86 | 31.74 | 22.8 | 4.61 |

It is observed that by not using the minimum SAD-based technique suggested for ITU H.263 encoding, the incurred bit rate cost is slightly higher. Using a slightly modified MPEG-4 mode selection scheme as described in algorithm 2 (above), during ITU H.263 encoding results in a bit rate increase of less than 11%, compared with the minimum SAD method, to achieve approximately the same PSNR. When an ITU H.264 selection scheme was used as described above, the performance was even better, and very close to the performance that can be achieved using the minimum SAD method contemplated by ITU H.263 suggested documentation. The bit rate increase when an ITU H.264 selection scheme was used was below 5%. Notably, the rate actually decreased in some cases when the H.264 mode selection technique was used.

In short, two different alternatives studied for ITU H.263 intra-prediction mode selection were studied. ITU H.264 mode selection can be used for ITU H.263 intra-prediction, but is performed in a spatial domain, in contrast to the suggested documentation for ITU H.263 intra-prediction. MPEG-4 mode selection can also be used for ITU H.263 intra-prediction, but is much less complex than the suggested documentation for ITU H.263. If power consumption is not a major concern, the mode selection decisions of an ITU H.264 mode selection engine serve as a good alternative for the minimum SAD method that requires the DCT coefficients. The performance gap is very small. If even lower complexity is desired, the mode selection decisions of MPEG-4 mode selection engine, as slightly modified by algorithm 2 (above), is an alternative with a reasonably lower performance.

A number of different embodiments have been described. These and other embodiments are within the scope of the following claims.

The invention claimed is:

1. An encoding device comprising:
 a mode selection engine that performs mode selection for intra-prediction encoding of a non-encoded frame regardless of whether the encoding device is programmed to comply with a first encoding standard or a second encoding standard;
 a first encoder that performs the intra-prediction encoding of the non-encoded frame according to the selected mode in compliance with the first encoding standard when the encoding device is programmed to comply with the first encoding standard; and
 a second encoder that performs the intra-prediction encoding of the non-encoded frame according to the selected mode in compliance with the second encoding standard when the encoding device is programmed to comply with the second encoding standard,
 wherein the encoding device is configured to receive programming instructions that specify one of a plurality of encoding standards, the plurality of encoding standards comprising the first encoding standard and the second encoding standard, and wherein the encoding device is configured to use the first encoder to perform the intra-prediction encoding of the non-encoded frame when the received instructions specify the first encoding standard and configured to use the second encoder to perform the intra-prediction encoding of the non-encoded frame when the received instructions specify the second encoding standard.

2. The encoding device of claim 1, wherein the encoding device can be programmed to comply with either the first encoding standard or the second encoding standard.

3. The encoding device of claim 1, wherein first encoder and the second encoder comprise video encoders that encode video sequences.

4. The encoding device of claim 1, wherein the mode selection engine forms part of the first encoder and the second encoder implements the mode selection engine from the first encoder when the encoding device is programmed to comply with the second encoding standard.

5. The encoding device of claim 1, wherein the first encoding standard comprises an International Telecommunication Union (ITU) H.264 standard and the second encoding standard comprises an ITU H.263 standard.

6. The encoding device of claim 5, wherein the mode selection engine performs mode selection in a spatial domain.

7. The encoding device of claim 1, wherein the first encoding standard comprises a Moving Picture Experts Group (MPEG)-4 standard and the second encoding standard comprises an ITU H.263 standard.

8. The encoding device of claim 7, wherein the mode selection engine performs mode selection in a DCT domain, but in a different manner than mode selection as suggested by the ITU H.263 standard.

9. The encoding device of claim 1, wherein suggested standards documentation for the first encoding standard specifies intra-prediction in a first domain, and suggested standards documentation for the second encoding standard specifies intra-prediction in a second domain, wherein the mode selection engine performs mode selection in the first domain regardless of whether the encoding device is programmed to comply with the first encoding standard or the second encoding standard.

10. The encoding device of claim 1, wherein suggested standards documentation for the first encoding standard specifies intra-prediction in a spatial domain, and suggested standards documentation for the second encoding standard specifies intra-prediction in a discrete cosine transform (DCT) domain.

11. The encoding device of claim 10, wherein the mode selection engine performs mode selection in the spatial domain regardless of whether the encoding device is programmed to comply with the first encoding standard or the second encoding standard.

12. The encoding device of claim 1, further comprising a transmitter to transmit video frames encoded by one of the first and second encoders.

13. The encoding device of claim 12, further comprising a video capture device to capture video frames in real-time, the first and second encoders being configured to encode the video frames in real-time and the transmitter being configured to transmit the encoded video frames in real-time.

14. A method comprising performing mode selection in a spatial domain for intra-prediction encoding of a non-encoded frame in an encoding device programmed to comply with an encoding standard having suggested standards documentation that specifies intra-prediction in a discrete cosine transform (DCT) domain.

15. The method of claim 14, further comprising receiving programming instructions specifying the encoding standard from a plurality of encoding standards.

16. The method of claim 14, further comprising performing intra-prediction encoding based on a selected mode in compliance with the encoding standard.

17. The method of claim 16, further comprising performing intra-frame encoding in compliance with the encoding standard.

18. The method of claim 14, wherein the encoding standard comprises an International Telecommunication Union (ITU) H.263 standard.

19. A method comprising:
performing mode selection for intra-prediction encoding of a non-encoded frame using a mode selection engine in compliance with a first encoding standard regardless of whether an encoding device is programmed to comply with the first encoding standard or a second encoding standard;
receiving programming instructions that specify one of a plurality of encoding standards, the plurality of encoding standards comprising the first encoding standard and the second encoding standard;
performing the intra-prediction encoding of the non-encoded frame according to the selected mode in compliance with the first encoding standard when the encoding device is programmed to comply with the first encoding standard, wherein the encoding device is programmed to comply with the first encoding standard when the received programming instructions specify the first encoding standard; and
performing the intra-prediction encoding of the non-encoded frame according to the selected mode in compliance with the second encoding standard when the encoding device is programmed to comply with the second encoding standard, wherein the encoding device is programmed to comply with the second encoding standard when the received programming instructions specify the second encoding standard.

20. The method of claim 19, wherein the first encoding standard comprises an International Telecommunication Union (ITU) H.264 standard and the second encoding standard comprises an ITU H.263 standard.

21. The method of claim 19, wherein the first encoding standard comprises a Moving Picture Experts Group (MPEG)-4 standard and the second encoding standard comprises an ITU H.263 standard.

22. The method of claim 19, further comprising performing mode selection in a spatial domain.

23. The method of claim 19, wherein suggested standards documentation for the first encoding standard specifies intra-prediction in a first domain, and suggested standards documentation for the second encoding standard specifies intra-prediction in a second domain, the method further comprising performing mode selection in the first domain regardless of whether the encoding device is programmed to comply with the first encoding standard or the second encoding standard.

24. The method of claim 23, wherein the suggested standards documentation for the first encoding standard specifies intra-prediction in a spatial domain, and the suggested standards documentation for the second encoding standard specifies intra-prediction in a discrete cosine transform (DCT) domain.

25. An apparatus comprising:
a mode selection engine that performs mode selection for intra-prediction encoding of a non-encoded frame regardless of whether the encoding apparatus is programmed to comply with first encoding standard or a second encoding standard;
means for receiving programming instructions that specify one of a plurality of encoding standards, the plurality of encoding standards comprising the first encoding standard and the second encoding standard;
means for performing the intra-prediction encoding of the non-encoded frame according to the selected mode in compliance with the first encoding standard when the encoding apparatus is programmed to comply with the first encoding standard, wherein the apparatus is programmed to comply with the first encoding standard when the received programming instructions specify the first encoding standard; and
means for performing the intra-prediction encoding of the non-encoded frame according to the selected mode in compliance with the second encoding standard when the encoding apparatus is programmed to comply with the second encoding standard, wherein the apparatus is programmed to comply with the second encoding standard when the received programming instructions specify the second encoding standard.

26. The apparatus of claim 25, wherein the apparatus comprises a chipset that can be programmed to comply with either the first encoding standard or the second encoding standard.

27. The apparatus of claim 25, wherein the mode selection engine forms part of a first encoder and a second encoder implements the mode selection engine from the first encoder when the encoding apparatus is programmed to comply with the second encoding standard.

28. The apparatus of claim 25, wherein the mode selection engine comprises hardware.

29. The apparatus of claim 28, wherein:
the means for performing the intra-prediction encoding according to the selected mode in compliance with the first encoding standard comprises a combination of hardware and software including the mode selection engine; and
the means for performing the intra-prediction encoding according to the selected mode in compliance with the second encoding standard comprises another combination of hardware and software including the mode selection engine.

30. The apparatus of claim 25, wherein suggested standards documentation for the first encoding standard specifies intra-prediction in a first domain, and suggested standards documentation for the second encoding standard specifies intra-prediction in a second domain, wherein the mode selection engine performs mode selection in the first domain regardless of whether the encoding apparatus is programmed to comply with the first encoding standard or the second encoding standard.

31. The apparatus of claim 30, wherein suggested standards documentation for the first encoding standard specifies intra-prediction in a spatial domain, and suggested standards documentation for the second encoding standard specifies intra-prediction in a discrete cosine transform (DCT) domain.

* * * * *